(12) United States Patent
Falkenstein

(10) Patent No.: US 8,606,488 B2
(45) Date of Patent: Dec. 10, 2013

(54) METHOD FOR OPERATING A HYBRID MOTOR VEHICLE

(75) Inventor: Jens-Werner Falkenstein, Aalen (DE)

(73) Assignee: Robert Bosch GmbH, Stuttgart (DE)

( * ) Notice: Subject to any disclaimer, the term of this patent is extended or adjusted under 35 U.S.C. 154(b) by 913 days.

(21) Appl. No.: 11/793,917

(22) PCT Filed: Oct. 24, 2005

(86) PCT No.: PCT/EP2005/055476
§ 371 (c)(1),
(2), (4) Date: Dec. 28, 2009

(87) PCT Pub. No.: WO2006/069833
PCT Pub. Date: Jul. 6, 2006

(65) Prior Publication Data
US 2010/0089064 A1    Apr. 15, 2010

(30) Foreign Application Priority Data

Dec. 23, 2004   (DE) .......................... 10 2004 062 012

(51) Int. Cl.
*F02D 11/10*    (2006.01)

(52) U.S. Cl.
USPC ...................... 701/110; 180/65.275

(58) Field of Classification Search
USPC ........ 701/102, 107, 110, 112, 114, 22; 123/2,
123/339.1, 339.15; 477/3; 180/65.21,
180/65.265, 65.285, 65.8, 65.275, 65.28;
903/902, 910, 912, 940, 945, 903, 905,
903/906
See application file for complete search history.

(56) References Cited

U.S. PATENT DOCUMENTS

| | | | |
|---|---|---|---|
| 5,845,222 A * | 12/1998 | Yamamoto et al. | 701/41 |
| 6,085,723 A | 7/2000 | Pels et al. | |
| 6,152,254 A * | 11/2000 | Phillips | 180/422 |
| 6,336,063 B1 * | 1/2002 | Lennevi | 701/22 |
| 6,336,070 B1 | 1/2002 | Lorenz et al. | |
| 6,440,037 B2 * | 8/2002 | Takagi et al. | 477/37 |
| 7,305,965 B2 * | 12/2007 | Zillmer et al. | 123/339.1 |
| 7,392,871 B2 * | 7/2008 | Severinsky et al. | 180/65.28 |
| 7,520,353 B2 * | 4/2009 | Severinsky et al. | 180/65.28 |
| 7,597,164 B2 * | 10/2009 | Severinsky et al. | 180/65.27 |
| 7,693,637 B2 * | 4/2010 | Mensler et al. | 701/55 |
| 7,698,044 B2 * | 4/2010 | Prakash et al. | 701/82 |
| 2005/0023055 A1 * | 2/2005 | Imazu et al. | 180/65.2 |
| 2005/0080540 A1 * | 4/2005 | Steinmetz et al. | 701/55 |
| 2007/0149349 A1 * | 6/2007 | Utsumi et al. | 477/3 |
| 2007/0163235 A1 * | 7/2007 | Ando et al. | 60/277 |

(Continued)

FOREIGN PATENT DOCUMENTS

| | | |
|---|---|---|
| DE | 197 09 134 | 9/1998 |
| DE | 197 21 298 | 11/1998 |

(Continued)

*Primary Examiner* — John Kwon
*Assistant Examiner* — Johnny Hoang
(74) *Attorney, Agent, or Firm* — Merchant & Gould P.C.

(57) ABSTRACT

The invention relates to a method for operating the drive of a hybrid motor vehicle by an internal combustion engine torque and the torque of at least one electric motor which are superimposed in such a way that a common drive torque of the hybrid motor vehicle is produced. According to the invention, the torque of the internal combustion engine is influenced by the speed of rotation thereof or a signal derived therefrom and the torque of the electric motor is influenced by the speed of rotation or the signal derived therefrom.

13 Claims, 1 Drawing Sheet

(56) References Cited

U.S. PATENT DOCUMENTS

| | | | |
|---|---|---|---|
| 2007/0163540 A1* | 7/2007 | Tomatsuri et al. | 123/357 |
| 2007/0194763 A1* | 8/2007 | Egami et al. | 322/59 |
| 2007/0235006 A1* | 10/2007 | Nishigaki et al. | 123/339.1 |
| 2007/0255485 A1* | 11/2007 | Kaita | 701/102 |
| 2008/0236913 A1* | 10/2008 | Ichimoto | 180/65.2 |
| 2009/0005924 A1* | 1/2009 | Hasegawa et al. | 701/22 |
| 2009/0008165 A1* | 1/2009 | Muta | 180/65.2 |

FOREIGN PATENT DOCUMENTS

| | | |
|---|---|---|
| DE | 198 39 315 | 3/2000 |
| DE | 199 39 250 | 3/2001 |
| DE | 103 25 262 | 12/2003 |
| EP | 1 273 822 | 1/2003 |
| JP | 2000114507 | 4/2000 |
| JP | 2004-242450 | 8/2004 |
| JP | 2004257051 | 9/2004 |
| WO | WO 97/44664 | 11/1997 |

* cited by examiner

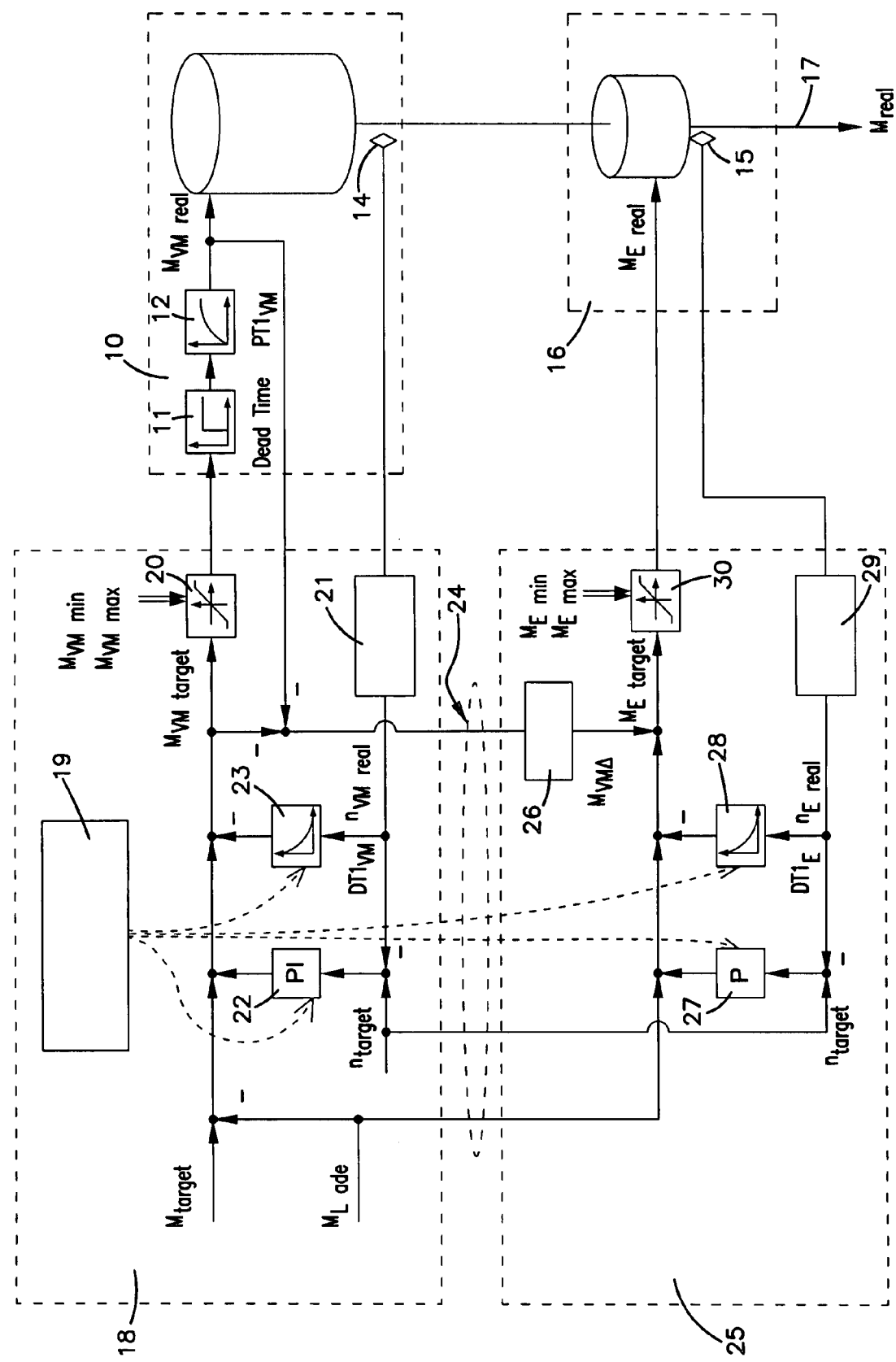

METHOD FOR OPERATING A HYBRID MOTOR VEHICLE

In modern motor vehicle drives, use is made of control functions and control algorithms that contain feedback of the rotational speeds of the units or, derived from this, signals with respect to the torques of the units. This is the case, for example, in the idle regulation or rotational speed regulation of an internal combustion engine. Likewise, in the so-called active surge damping control a correction of the internal combustion engine torque takes place, based on the periodic rotational speed fluctuations of the internal combustion engine. With increasing rotational speed the torque of the internal combustion engine is reduced, and with decreasing rotational speed the torque is increased, whereby a damping of the jerking or drive train oscillations results.

With appropriate feedback of rotational speeds of the units or signals derived therefrom with respect to the torques of the units, attention must be paid to a slight time delay between the rotational speed detection and the influencing of the torque. With constant stability reserves, time delays or dead times reduce the possible amplifications in the feedback branches. The effects of, for example, rotational speed regulation or active surge damping control are thus limited.

In the torque of a reciprocating- or rotary-piston engine conventional in motor vehicles, interventions can only take place at the time points of the individual firings or combustions. In the control apparatus of the internal combustion engine, the detection of the internal combustion engine rotational speed and the calculation of algorithms for the rotational speed regulation or, as the case may be, for the active surge damping control takes place in most cases so as to be synchronized to the individual firings or combustions, whereby slight delays result.

Modern gasoline engines with intake-manifold fuel injection possess an electronic throttle valve for air-mass flow regulation. The accelerator pedal is mechanically decoupled from the electronic throttle valve. The torque of the gasoline engine can be preset through the influencing of the throttle valve and the ignition advance angle by the engine control, and in a diesel engine through the selection of the injection parameters. The engine control determines the instantaneous actual torque on the basis of measured or estimated values, in the case of the gasoline engine with intake-manifold fuel injection from, for example, the rotational speed, the intake manifold pressure, firing time point, and the air ratio $\lambda$.

Hybrid drives for motor vehicles contain, in addition to the internal combustion engine, one or more electric motors. Thus, in case of parallel hybrids an adding of the torques of the internal combustion engine and of at least one electric motor takes place. The electric motor is, for example, connected as a starter generator to the belt drive or to the crankshaft of the internal combustion engine.

In most cases, the electric motors used in hybrid motor vehicles possess controls that operate according to the principle of sampling control with time-synchronous rotational-speed determination and a time-synchronous calculation cycle of the control algorithms. Thus, interventions in the torque of the electric motors are likewise possible in a time-synchronous manner.

In most cases, use is made of a control apparatus for the internal combustion engine and a control apparatus for the electric motor that communicate with each other via a bus system. In the data exchange via the bus system, time delays are present, in addition to the time delay caused by different calculation cycles (a calculation cycle synchronized to the firings or combustions for the internal combustion engine and a time-synchronized calculation cycle for the electric motor).

DE 198 39 315 A1 discloses a drive system for a hybrid motor vehicle, in which system an electric motor is coupled to an internal combustion engine and is equipped to reduce, upon activation and/or deactivation of the overrun cutoff, the acceleration jerk associated with the latter, through application of a torque, the jerk-reducing action of the electric motor being controlled through an activation or deactivation signal of the overrun cutoff.

According to the proposal, a torque of an internal combustion engine is influenced through its rotational speed or a signal derived therefrom and, in addition, a torque of the electric motor is influenced through its rotational speed or a signal derived therefrom. Thus, the detection of the rotational speeds as well as the influencing of the torques, which influencing is based on these speeds, can take place in the calculation cycles that are, in each case, most favorable for a low time delay. This is further enhanced when a feedback of the rotational speeds of the internal combustion engine and of the electric motor take place in parallel control loops.

Low time delays and a high bandwidth are achieved when the feedback of the rotational speeds takes place outside a data-bus system, by means of which a control apparatus of the internal combustion engine communicates with a control apparatus of the electric motor.

It is beneficial when a rotational speed control of the internal combustion engine takes place by means of a proportional-integral control unit and the rotational speed control of the electric motor takes place by means of a proportional control unit. Preferably, amplification factors for respective proportional components of the proportional-integral control unit and of the proportional control unit are set by means of a higher-level coordination. In this way, the instructions can be adapted to an instantaneous state of the drive train. It is beneficial when the amplification factors are adjusted with reference to instantaneously-available torque reserves of the internal combustion engine and/or of the electric motor.

It is advantageous when an integral-action component of the proportional-integral control unit can be initialized or shut down, depending on the operating condition. For each operating condition, e.g. rotational speed control or active surge damping control, an appropriate control behavior can be set. Upon leaving the rotational speed control, the amplification factors are preferably set to null and the integral-action component is initialized.

Preferably, for the active surge damping control the actual rotational speeds of the internal combustion engine and the electric motor are fed back via differential elements with first-order delay or multiply differentiating elements with multiple-order delay and super-imposed onto the respective target torque. This can take place with low time delay and with high bandwidth.

In the operational state of rotational speed regulation, the active surge damping control can be selectively switched on or off. Undesired relative oscillations between the internal combustion engine and the electric motor can be avoided. For this purpose, it is advantageous when the amplifications of the differential elements with first-order delay or amplifications of the multiply differentiating elements with multiple-order delay are adjusted by means of a higher-level coordination dependent on the state of the drive train. It is beneficial when, for supporting the internal combustion engine through the electric motor, a difference torque formed from the target torque and the actual torque of the internal combustion engine influences the torque of the electric motor via a lowpass filter.

DRAWING

In the following, the invention is explained in detail in an embodiment example, with reference to the associated drawing. The single FIGURE shows, in schematic manner, a block circuit diagram for implementation of the method according to the invention.

In the FIGURE, an embodiment example is represented as a block circuit diagram for the invention. Preferably, for rotational speed regulation or active surge damping control, as the case may be, the torque of an internal combustion engine 10 is influenced through the rotational speed of the internal combustion engine 10 or a signal derived from the rotational speed, and in addition, the torque of at least one electric motor 16 is influenced through the rotational speed of the electric motor 16 or a signal derived from the rotational speed.

For this purpose, the detections of the rotational speeds and the influencing of the torques, which influencing is based on the rotational speeds, can take place in calculation cycles that are, in each case, advantageous for a low time delay, in the case of the internal combustion engine 10, for example, synchronously to the firings or combustions, and, in the case of the electric motor or motors 16, time-synchronously. The effects or amplification factors of individual rotational-speed feedbacks are adjusted by means of a higher-level coordination 19, e.g. on the basis of instantaneous torque reserves of the internal combustion engine 10 and the electric motor 16.

An internal combustion engine 10, formed as a gasoline engine, is provided with intake-manifold fuel injection, an electronic gas pedal ("EGas", electronic throttle valve), and a catalytic converter (not shown).

A flywheel (not shown) of the internal combustion engine 10 is coupled in a rotationally-rigid manner to an electric motor 16. In stationary operation, the actual torque $M_{VM\ real}$, $M_{E\ real}$ of the internal combustion engine 10 and of the electric motor 16 are superimposed to form an actual torque $M_{real}$ of the entire drive available at an output 17, i.e. to form the total torque of the internal combustion engine 10 and the electric motor 16. Assigned to the internal combustion engine 10 and to the electric motor 16 is, in each case, a control apparatus 18, 25, both control apparatuses 18 and 25 communicating via a bus system 24. The internal combustion engine 10 and the electric motor 16 possess, in each case, a rotational speed sensor 14 and 15. The corresponding control apparatus 18 or 25, with the aid of a sensor evaluator 21 or 29, determines an actual rotational speed $n_{VM\ real}$ of the internal combustion engine 10 or the actual rotational speed $n_{E\ real}$ of the electric motor 16, as the case may be. The target torque $M_{VM\ target}$ of the internal combustion engine 10 is appropriately limited in the control apparatus 18 of the internal combustion engine 10 through the limiter 20. Through dynamic filling effects in the intake manifold, modeled as dead-time element 11 and delay element 12 of first order ($PT1_{VM}$), the actual torque $M_{VM\ real}$ follows only in a delayed manner. A moment reduction can be accelerated through ignition advance-angle intervention.

A limiter 30 limits the target torque $M_{VM\ target}$ of the electric motor 16 based on the physical limits of the electric motor 16 and of an electrical energy storage (not shown). A torque control of the electric motor 16 is undertaken in an approximately delay-free manner.

A higher-lever control (not shown) provides a drive target moment $M_{target}$ for the entire drive. By means of a target charge moment $M_{Lade}$, an intervention is provided through which the supplying of an vehicle electrical system (not shown) and of the electrical energy storage is ensured. In the case of negative $M_{Lade}$, the electric motor 16 goes into generator operation, and the target torque of the internal combustion engine 10 is correspondingly increased in order to compensate for the load of the electric motor 16. The rotational speed control consists of a controller 22, formed as a proportional-integral control unit (PI), in the control apparatus 18 of the internal combustion engine 10 and of a controller 27, formed as a proportional control unit (P), in the control apparatus 25 of the electric motor 16. The common rotational speed target value $n_{target}$ for the internal combustion engine 10 and the electric motor 16 is transmitted via the bus system 24 from the control apparatus 18 of the internal combustion engine 10 to the control apparatus 25 of the electric motor 16. In both control apparatuses 18 and 25 there takes place a comparison of the respective actual rotational speed $n_{VM\ real}$ or $n_{E\ real}$, as the case may be, with the target rotational speed $n_{target}$. In the case of rotational speed deviations, the effects of the proportional component of the PI control 22 in the control apparatus 18 of the internal combustion engine 10 and of the P control 27 in the control apparatus 25 of the electric motor 16 are summed.

The two control loops operate in parallel and in the optimal calculation cycles in each case. They are not closed via the bus system 24, which makes possible low time delays and thus high bandwidths. A coordination 19 provides the amplification factors for the proportional component of the PI control 22 in the control apparatus 18 of the internal combustion engine 10 and the P control 27 in the control apparatus 25 of the electric motor 16. The provided values are adapted to the instantaneous state of the drive train. Since precisely one degree of freedom of rotational speed is present, only one integral-action component is used. The integral-action component of the PI control unit 22 in the control apparatus 18 of the internal combustion engine 10 acts on the target torque $M_{VM\ target}$ of the internal combustion engine 10. In this way, the internal combustion engine 10, in stationary operation, compensates for imprecisions of the system, e.g. as a consequence of temperature-dependent frictional conditions. The actual rotational speeds $n_{VM\ real}$ and $n_{E\ real}$ asymptotically approach the target rotational speed $n_{target}$. The P control unit 27 in the control apparatus 25 of the electric motor 16 then sees no control deviation and supplies no additional torque; the electric motor 16 adjusts the target charge moment $M_{Lade}$ and thus generates with high precision the charge power requested by the control. In the case of sudden load variations, e.g. caused by auxiliary units, the limiter 20 or the delay (dead-time element 11 and delay element 12) in the torque control of the internal combustion engine 10 can lead to a large deviation between the target torque $M_{VM\ target}$ and the actual torque $M_{VM\ real}$ of the internal combustion engine 10.

The difference between the two torques is transmitted via the bus system 24 to the control apparatus 25 of the electric motor 16, is lowpass filtered, and is superimposed on the electric motor 16 as a difference torque $M_{VM\ \Delta}$, in order to support the internal combustion engine 10. The lowpass filter 26 suppresses higher-frequency signal components that are generated by the proportional component of the PI controller 22 or by the active surge damping control in the control apparatus 18 of the internal combustion engine 10. Through this means, the difference torque $M_{VM\ \Delta}$ is essentially determined by the integral-action component of the PI controller 22 in the control apparatus 18 of the internal combustion engine 10. The integral-action component possesses a lower dynamic in comparison to the proportional elements. Thus, the time delay of the difference torque $M_{VM\ \Delta}$ through the transmission via the bus system 24 has only a slight influence here on the stability reserve of the rotational speed control.

A coordination 19 provides, according to the operating state, the amplification factors of the P controller 27 as well as the PI controller 22 and initializes or shut downs, as required, the integral-action component. Upon leaving the operating state of "rotational speed control", the amplification factors of the P controller 27 as well as of the PI controller 22 are set to zero and the integral-action component of the PI controller 22 is initialized.

For active surge damping control, the actual rotational speeds $n_{VM\ real}$ of the internal combustion engine 10 and $n_{E\ real}$ of the electric motor 16 are fed back with first-order delay via differential elements 23 and 28, respectively, and superimposed onto the respective target torques $M_{VM\ target}$ and $M_{E\ target}$, respectively. Both feedbacks operate in a parallel manner in the optimal calculation cycles in each case and act in common. They are not closed by means of the bus system 24, which makes possible low time delays and thus high bandwidths. A coordination 19 provides the amplification factors for the differential element 23 in the control apparatus 18 of the internal combustion engine 10 and the differential element 28 in the control apparatus 25 of the electric motor 16, based on the instantaneous state of the drive train. In the operating state of "rotational speed control", the active surge damping control can be selectively switched off or can act in a supporting manner.

If, as assumed in the embodiment example, the non-illustrated flywheel of the internal combustion engine 10 is coupled in a rotationally-rigid manner to the electric motor 16, then a common rotational speed detector 14 or 15 can be employed for the internal combustion engine 10 and the electric motor 16, which detector is evaluated synchronously to the optimal calculation cycle of the internal combustion engine 10 and, in addition, synchronously to the optimal calculation cycle of the electric motor 16. In the case of separated control apparatuses 18, 25, a detector evaluation 21 in the control apparatus 18 of the internal combustion engine 10 and an additional detector evaluation 29 in the control apparatus 25 of the electric motor 16 are advantageous.

If the non-illustrated flywheel of the internal combustion engine 10 is coupled to an electric motor 16 in a rotationally-elastic manner, e.g. through a torsional vibration damper of a coupling arranged between the internal combustion engine 10 and the electric motor 16, then a system results that is capable of oscillation. Separated rotational speed detectors 14 and 15 are employed for the internal combustion engine 10 and the electric motor 16. By means of the parallel feedback of the rotational speeds according to the invention, a damping of undesired relative oscillations between the internal combustion engine 10 and the electric motor 16 can be achieved.

The invention claimed is:

1. A method of operating a hybrid motor vehicle, wherein a torque of an internal combustion engine and a torque of at least one electric motor are superimposed in order to form a common torque of the hybrid vehicle drive of the hybrid motor vehicle, the method comprising:

communicating via a data bus system between an engine control system and a motor control system;

influencing the torque of the internal combustion engine via the engine control system in response to a rotational speed of the internal combustion engine and a first feedback signal derived therefrom and transmitted to the engine control system; and influencing the torque of the at least one electric via the motor control system in response to a rotational speed of the at least one electric motor and a second feedback signal derived therefrom;

wherein the first and second feedback signals are transmitted outside the data bus system;

wherein rotational speed regulation of the hybrid vehicle drive is at least partially controlled by the influencing of the torque of the internal combustion engine and the influencing of the torque of the at least one electric motor; and wherein a proportional-integral control unit controls the rotational speed of the internal combustion engine and a proportional control unit controls the rotational speed of the at least one electric motor.

2. A method according to claim 1, wherein the first and second feedback signals occur in parallel control loops.

3. A method according to claim 1, wherein amplification factors for a respective proportional-action component of the proportional-integral control unit and of the proportional control unit are set by a higher-level coordination.

4. A method according to claim 3, wherein the amplification factors are set on a basis of instantaneously available torque reserves of the internal combustion engine or of the at least one electric motor.

5. A method according to claim 3, wherein an integral element of the proportional-integral control unit is initialized or shut down depending on an operating state.

6. A method according to claim 3, wherein upon leaving rotational speed control, the amplification factors are set to zero and an integral component is initialized.

7. A method according to claim 1, wherein in an active surge damping control, actual rotational speeds of the internal combustion engine and the at least one electric motor are fed back via differential elements with first-order delay or via multiple differentiating elements with multiple-order delay and are superimposed onto respective target torques.

8. A method according to claim 7, wherein in an operating state of rotational speed control, the active surge dumping can be selectively switched off or on.

9. A method according to claim 7, wherein amplifications of the differential elements with first-order delay or amplifications of the multiple differentiating elements with multiple-order delay and are set by means of a higher-level coordination in dependence on a state of the hybrid vehicle drive.

10. A method according to claim 1, wherein a difference torque, formed from a target torque and an actual torque of the internal combustion engine, influences the torque of the at least one electric motor for supporting of the internal combustion engine through the at least one electric motor.

11. A method according to claim 1, wherein the rotational speed of the internal combustion engine is sensed by a first rotational sensor and a first feedback signal is transmitted via a first signal line from the first rotational sensor to a first differential element.

12. A method according to claim 11, wherein the rotational speed of the at least one electric motor is sensed by a second rotational sensor and the second feedback signal is transmitted via a second signal line from the second rotational sensor to a second differential element.

13. A method according to claim 1, wherein the rotational speed of the at least one electric motor is sensed by a second rotational sensor and the second feedback signal is transmitted via a second signal line from the second rotational sensor to a second differential element.

* * * * *